May 2, 1967     O. N. ODDSEN     3,317,257
ROLLER BEARING AND A METHOD OF MAKING SAME
Filed Sept. 2, 1964     2 Sheets-Sheet 1
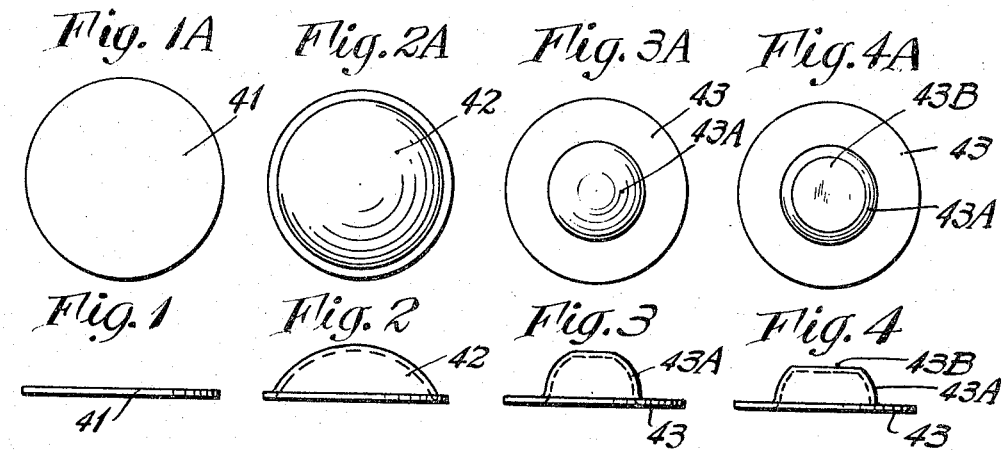
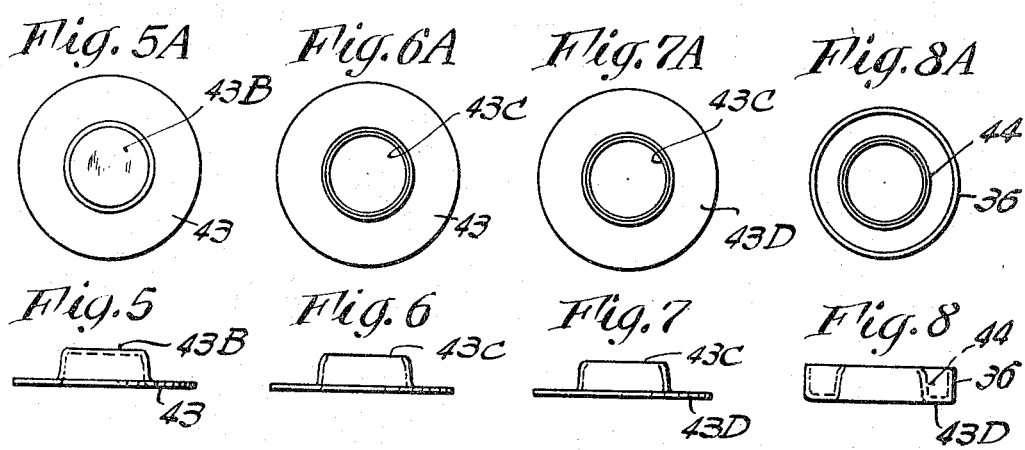
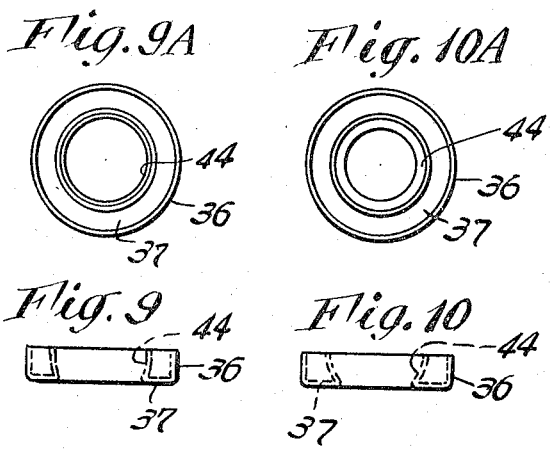
INVENTOR.
Odd N. Oddsen
BY
Arthur A. March
ATTORNEY

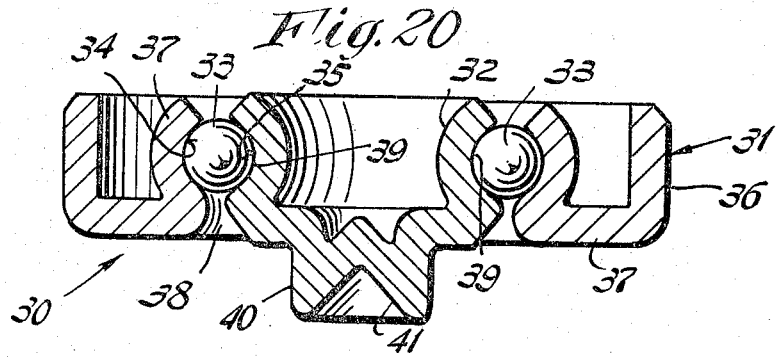
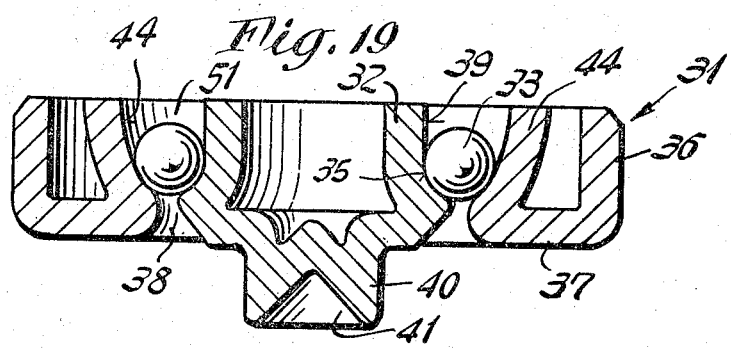
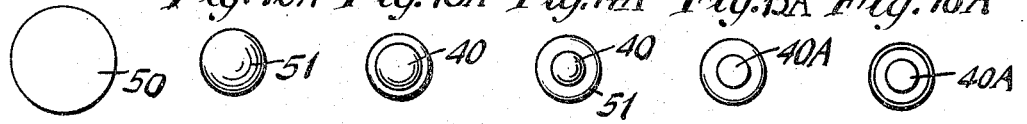
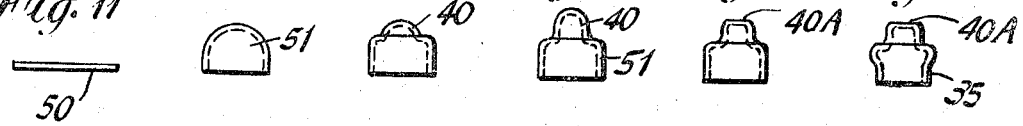
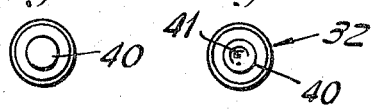
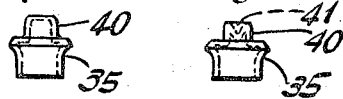

United States Patent Office 3,317,257
Patented May 2, 1967

3,317,257
ROLLER BEARING AND A METHOD OF
MAKING SAME
Odd N. Oddsen, School House Lane, Washington Valley,
Morristown, N.J. 07960
Filed Sept. 2, 1964, Ser. No. 393,948
1 Claim. (Cl. 308—191)

This invention relates in general to a roller bearing and a method of making the same. More specifically, the invention involves a roller bearing of the type having a unitary outer race, a unitary inner race and a plurality of ball bearings disposed therebetween.

Heretofore, many attempts have been made to produce a satisfactory roller bearing that may be manufactured in a simple, expedient and economical manner. For example, U.S. Patents 1,976,019 and 2,624,104 disclose attempts in this direction. However, each of the constructions disclosed provides a double wheel to form the outer race. Prior construction required more material, time and labor to fabricate the roller bearing than that needed with the use of the instant invention.

It is an object of this invention to provide an improved roller bearing construction and method of making the same with the expenditure of a minimum amount of time, labor and material.

Another object is to provide a roller bearing construction and method of making the same in which various components may be readily fabricated in an expedient and economical manner by stamping or drawing.

Still another object is to provide a roller bearing construction that is relatively simple in construction and inexpensive to produce while nevertheless being completely efficient and positive in operation.

Other features and advantages will become more readily apparent when considered in view of the specification and drawings, in which:

FIG. 1 illustrates an end view of the initial blank from which the outer race member is formed;

FIG. 1A is a plan view of FIG. 1;

FIGS. 2, 3 and 4 illustrate the end views of the successive intermediate forms in which the blank of FIGS. 1 and 1A is drawn or stamped;

FIGS. 2A, 3A and 4A are plan views of FIGS. 2, 3 and 4 respectively;

FIG. 5 illustrates an end view of still another intermediate form;

FIG 5A is a plan view of FIG. 5;

FIG. 6 illustrates the outer race member after a piercing operation in which a center portion is removed.

FIG. 6A is a plan view of FIG. 6;

FIG. 7 illustrates the shape of the blank after a trimming operation;

FIG. 7A is a plan view of FIG. 7;

FIG. 8 illustrates the blank drawn to its outer diameter;

FIG. 8A is a plan view of FIG. 8;

FIG. 9 shows a partially formed raceway of the outer race.

FIG. 9A is a plan view of FIG. 9;

FIG. 10 illustrates the finished form of the race;

FIG. 10A is a plan view of FIG. 10;

FIG. 11 is an end view of the blank from which the inner race member is formed.

FIG. 11A is a plan view of FIG. 11;

FIGS. 12 to 15 illustrate the successive intermediate drawing forms of the blank of FIG. 11;

FIGS. 12A to 15A are the respective plan views of FIGS. 12 to 15;

FIG. 16 is the partially formed inner race member;

FIG. 16A is a plan view of FIG. 16;

FIG. 17 is the finished raceway;

FIG. 17A is a plan view of FIG. 17;

FIG. 18 illustrates the inner race having the stem thereof finished;

FIG. 18A is the plan view of FIG. 18;

FIG. 19 illustrates a sectional side view of the component parts of the roller bearing in the initial assembled position thereof; and FIG. 20 illustrates a sectional side view of the roller bearing in its final assembled form.

The roller bearing 30 of the present invention is disclosed in its entirety in FIG. 20. It comprises an outer race member 31, and inner race member 32, and a series ball bearings 33 interposed between complemental raceway means 34, 35 formed integral with the respective race members 31 and 32.

The outer race 31 is defined by a member having a peripheral flange position 36 to define the rolling surface of the bearing, and an integrally connected annular web portion 37 that defines the side of the roller bearing 30. Integrally formed with the side of the bearing is an inturned portion 37 to define the annular outer raceway 34 which conforms in cross section substantially to a curvilinear portion of the ball bearing 33 retained in rolling engagement therewith. The outer race 31 is integrally formed of sheet material of generally uniform thickness with a generally cylindrically shaped flange portion 36.

The inner race 32 is defined by a generally cup-shaped complementary member adapted to be received within the opening 38 defined by the raceway portion 37 of the outer race member 31. The outer wall surface 39 of the cup-shaped, inner race 32, in its final assembled form, is shaped to conform with the inner curvilinear portion of the ball bearings 33. In the illustrated form of the invention, the outer end of the cup shaped, inner race member 32, is provided with an extending stem or boss 40, the end of which is provided with a conical recess 41 converging inwardly as shown in FIGS. 19 and 20. The inner race 32 is integrally formed of sheet material of generally uniform thickness and the stem 40 is continuous between the outer wall 39 forming a relatively rigid support for this portion.

As assembled, the respective raceway portions 34, 35 of the inner and outer races 31, 32 are each shaped to conform to a curvilinear portion of the ball bearings 33 retained therbetweeen. The arrangement is such that the complementary raceway portions 34, 35 engage a sufficent portion of the ball bearing 33 circumference to retain the same therebetween. Accordingly, the series of ball bearings 33 maintain their respective race members 31, 32 in relative rotation with respect to one another.

While the roller bearing 30 described can be made by any of several methods, a preferred method is to fabricate the respective race member 31, 32, by a stamping or drawing operation, to a shape which will enhance the final assembly thereof. In accordance with this invention the outer race 31 is formed for a round or disk shaped blank 41 of suitable material, e.g. metal, plastic or the like, as shown in FIGS. 1 and 1A. The blank or disk 41 is next subjected to a series of progressive stamping operations wherein the blank 41 is first formed into a dish or bowl shaped form 42, as evidenced in FIG. 1. As shown, the bowl shaped member 42 is again drawn to define hat shape form 43 (FIGS. 3 and 4) in which the crown portion 43A thereof is flattened to simulate a flattened dome. The blank thus formed is next subjected to a forming operation in which curvilinear annular wall portion of the dome is transformed to a substantially cylindrical shape. (See FIGS. 5 and 5A.) The next operation comprises piercing or cutting away the top 43B of the crown so that an opening 43C is provided, the latter being circumscribed by the substantially cylindrical wall (FIGS. 6, 6A). Next, if necessary, the flange or brim portion 43D of the member is trimmed to the desired outside diameter (FIGS. 7 and 7A). With the flange 43D properly trimmed, the shape of FIGS. 7 and 7A is then drawn to O.D. In drawing the O.D., as best seen in FIGS. 8 and 8A, the outer annular portion of the flange or brim 43D is latently bent to define the rolling periphery 36 of the outer race 31.

With the race member 31, thus partially formed, the substantial cylindrical surface 44 is expended outwardly as shown in FIGS. 9 and 9A. The race member is then finished by forming the expanded surface 44 so that the opposed diametrical portions therefor, in cross section, define curvilinear portions conforming to an arc.

The inner race 32 is likewise formed from a disk shaped blank 50, as best shown in FIGS. 11 and 11A. The disk 50 is drawn in a series of successive drawing operations—into a cup shaped member 51 having an outwardly extending protuberance to define a stem 40 formed in the bottom thereof. The successive drawing steps and the forms resulting therefrom are shown in FIGS. 12 to 15 and 12A to 15A respectively. In the final drawing operation, as seen in FIGS. 15 and 15A, the stem 40 in the bottom wall has been flattened at its outer end 40A.

The cylindrical wall portion of the cup shaped inner race member is then operated upon to partially define the inner raceway 39. This is accomplished by expanding inwardly the walls of the cup shaped portion to reduce the open end of the member. Preferably this inwardly expanding of the cup may be done in two successive steps, as evidenced by FIGS. 16 and 17. With the inner race 32 thus formed, the final operation to complete the forming of the same is that of forming the indentation or recess 41 in the outer end of the stem 40.

Thus with the outer race member 31 formed to the stage shown in FIGS. 10, 10A, and with the inner race member 32 finished to the stage as shown in FIGS. 18, 18A, the respective components are readied for final assembly.

Referring to FIG. 19, the assembly of the outer race 31, inner race 32 and the ball bearings 33 is attained by placing the inner race member 32, as shown, within the opening 38 of the outer race 31 so that the respective raceways forming portions 39, 35 thereof are coaxially disposed. Accordingly, the outwardly expanded raceway 44 of the outer member, and the inwardly expanded raceway 35 of the inner member define an annular opening 51 (FIG. 20) sufficiently larger to receive the ball bearings 33. However, the spacing between the lower ends of the respective members 31, 32 prohibit the balls 33 from dropping therethrough. Further, the respective lower end portions of the respective raceway members 34, 35 are formed to conform nearly to the opposed curvilinear portions of the balls 33. With the parts assembled, as shown in FIG. 19, the final operation is that of forming the respective upper ends of the inwardly and outwardly expanded raceways 34, 35 so that they conform to the circumference of the balls 33, as shown in FIG. 20. Thus in the final assembly, the balls 33 are positively retained in the race defined by 34 and 35.

From the foregoing, it will be apparent that the respective race members 31, 32 are simply formed by drawing the same from a preformed blank, in which a minimum of material is required to form the same. Further, the respective race members 31, 32 are formed so that they can be readily assembled in a minimum of time and with a minimum of effort.

While the invention has been described in illustrative detail, it will be understood that variations and modifications may be made without departing from the spirit of the invention or the scope of the appended claim.

I claim:

A roller bearing comprising:
(a) an integrally formed outer race member of sheet material of generally uniform thickness having an annular flange portion defining the rolling periphery of said bearing,
(b) an annular bearing seat concentrically disposed in spaced relationship with respect to said annular flange portion, said annular flange being substantially cylindrically shaped to form a rolling surface for said outer race, and said bearing seat having a curvilinear surface adapted to conform to the shape of the ball bearings,
(c) a web connecting said flange portion and seat portion to define the side of said roller bearing,
(d) a cup shaped inner race member of sheet material of generally uniform thickness having its wall portions defining a complementary bearing seat portion, said complementary seat portion having a curvilinear surface adapted to conform to the shape of the ball bearings, said cup shaped inner race member having a projecting stem portion extending between said bearing seat portion forming a relatively rigid support for said bearing seat portion, the center of said projecting stem portion being continuous and formed with a recess to strengthen the inner race member,
(e) and a series of ball bearings retained between the respective bearing seat portions of said inner and outer race members.

References Cited by the Examiner

UNITED STATES PATENTS 3,139,666  7/1964  Leciejewski _____ 29—148.4

FOREIGN PATENTS 1,316,280  12/1962  France.
572,772  4/1956  Italy.

MARTIN P. SCHWADRON, *Primary Examiner.*

FRANK SUSKO, *Examiner.*